United States Patent
Watt et al.

(10) Patent No.: US 6,269,952 B1
(45) Date of Patent: Aug. 7, 2001

(54) METHODS AND APPARATUS FOR USE IN PROCESSING AND TREATING PARTICULATE MATERIAL

(75) Inventors: John H. Watt, London; John Hugo Nellmapius, Bucks, both of (GB)

(73) Assignee: Earth Sciences Limited, Nassau (BS)

( * ) Notice: Subject to any disclaimer, the term of this patent is extended or adjusted under 35 U.S.C. 154(b) by 0 days.

(21) Appl. No.: 09/319,739

(22) PCT Filed: Dec. 11, 1997

(86) PCT No.: PCT/GB97/03410

§ 371 Date: Jun. 11, 1999

§ 102(e) Date: Jun. 11, 1999

(87) PCT Pub. No.: WO98/25704

PCT Pub. Date: Jun. 18, 1998

(30) Foreign Application Priority Data

Dec. 11, 1996 (GB) .................................................. 9625696
Jan. 17, 1997 (GB) .................................................. 9700932

(51) Int. Cl.⁷ ......................................................... B03B 1/00
(52) U.S. Cl. ................................... 209/3; 209/5; 209/17; 209/214; 209/590
(58) Field of Search ................................ 209/3, 2, 5, 12.1, 209/17, 18, 590, 214

(56) References Cited

U.S. PATENT DOCUMENTS

| | | | |
|---|---|---|---|
| 4,401,437 | * | 8/1983 | Poetschke et al. .................... 209/5 X |
| 4,712,742 | * | 12/1987 | Ogawa et al. ...................... 209/17 X |
| 4,778,594 | * | 10/1988 | Doctor ................................. 209/224 |
| 4,938,864 | * | 7/1990 | Frazier et al. ..................... 209/18 X |
| 5,887,724 | * | 3/1999 | Weyand et al. ............................ 202/2 |

FOREIGN PATENT DOCUMENTS

| | | |
|---|---|---|
| 259959A | 3/1988 | (EP) . |
| 528070 | 2/1993 | (EP) . |
| 2338745 | 8/1977 | (FR) . |

* cited by examiner

Primary Examiner—Tuan N. Nguyen
(74) Attorney, Agent, or Firm—Lowe Hauptman Gilman & Berner, LLP

(57) ABSTRACT

Spheres are released from within plurospheres by mixing a fluid with fly ash or bottom ash particulate material obtained by burning coal to form a slurry. The slurry is vibrated at an ultrasonic frequency and with sufficient power that plurospheres in the particulate material are cracked open to release spheres of the material which are encapsulated within the plurospheres. The so-treated material is separated from the slurry to obtain the released spheres.

22 Claims, 7 Drawing Sheets

METHODS AND APPARATUS FOR USE IN PROCESSING AND TREATING PARTICULATE MATERIAL

Figure 1:
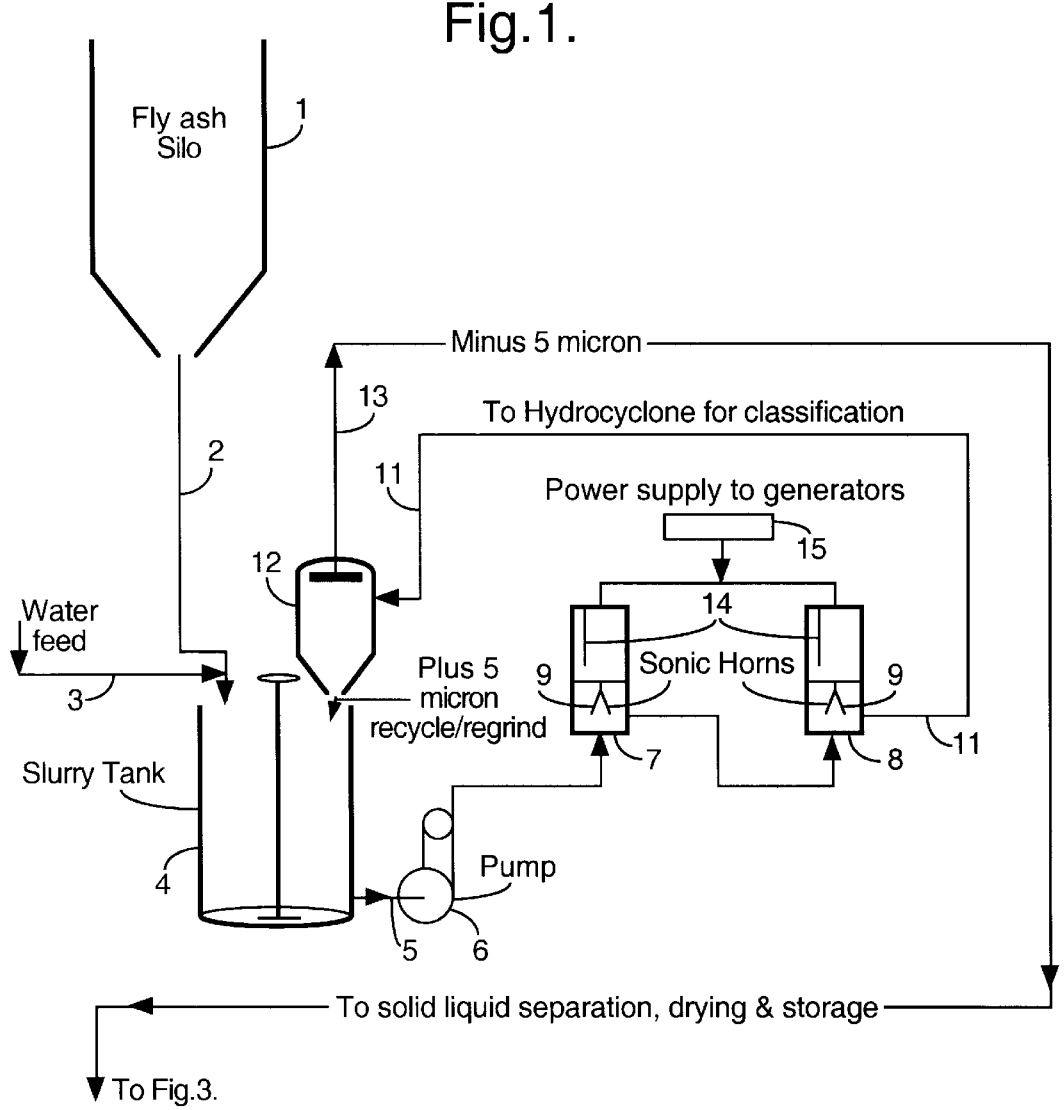

This invention relates to methods and apparatus for use in processing and treating particulate material.

A process to be described below may be used, for example, to produce particulate material of required dimensions, and in the recovery of specific materials, for example, metals. A further method to be described below is concerned with coating particulate material.

In a particular arrangement to be described below, as an example, material contained in a slurry pulp is subjected to vibrations at ultrasonic frequencies and then given a centrifugal treatment in a cyclone in order to enable particles of a required size to be separated out. A magnetic separator may be used to separate out magnetisable materials.

In the specification of European patent application number 87306243.4, which was published under number 259959 on Mar. 16, 1998, a process and an apparatus were described for treating a flowing slurry of particulate material in a liquid. A plurality of ultrasonic transducers were mounted on the underside of a tray having upturned edges and the tray was suspended by cables to facilitate vibratory flexing and undulation. Slurry flowing lengthwise down the tray was treated to a "microscopic scrubbing" by ultrasonic vibrations coupled through the tray.

In the specification of European patent application number 9111504.2, which was published under number 528070 on Feb. 24, 1993, a method and apparatus for preparing pourable bulk goods was described in which the bulk goods were all owed t o fall into a first tank where they were washed by a liquid directed at them through nozzles to detach dirt particles. They were then cleaned and separated in a second tank; the cleaned goods being dried and given thermal treatment by being passed through a pipeline system which was heated on its outside and could be rotated.

The specification of French patent application number 7601726, which was published under number 2,338,745 on Aug. 19, 1977, disclosed a method and device for subjecting a mixture of sand and water to irradiation by ultrasonic waves from rotating transducers which were plunged into the water-sand mixture whilst water was forced upwards through the mixture.

In the specification of Japanese patent application number 2,068,581, which was published under number 3,270,777 on Dec. 2, 1991, there was proposed a method for treating fly ash containing a toxic substance in which an ultrasonic wave was applied to fly ash suspended in water to separate the toxic materials and an ozone containing gas was bubbled through the suspension to decompose the toxic substance.

The removal of $SO_4$ from a coal ash slurry was proposed in the specification of Japanese patent application number 870,061,344 which was published under number 63229189 on Sep. 26, 1988. The specification proposed that a coal ash and water slurry be treated by ultrasonic waves to separate water containing $SO_4$ and desulphurised coal ash.

Arrangements illustrative of the invention will now be described, by way of example, with reference to FIGS. 1 to 9 of the accompanying drawings which show in block schematic diagrammatic form various arrangements of apparatus and their method of operation.

Referring to FIG. 1 of the drawings, there is shown diagrammatically a silo 1 from which ash particles, which might be fly ash or bottom ash obtained by burning coal in a power station, are fed under the influence of gravity via a conduit 2. Near to the lower end of the conduit 2, the ash is mixed with water obtained via a pipe 3, and the mixture is passed into a slurry tank 4 where it is agitated. Mixture from near to the bottom of the slurry tank 4 is fed, as indicated at 5, to a pump 6, which pumps the mixture to continuous flow chambers 7 and 8, in which the mixture is subjected to vibrations at ultrasonic frequencies. The ultrasonic vibrations are delivered to the mixture via horns, diagrammatically indicated at 9, and the mixture is passed via a conduit 11 to a hydro-cyclone 12 for separation into particles of differing sizes. In the particular example, particles of less than 5 microns are withdrawn via conduit 13 and particles which are larger than 5 microns are returned from the bottom of the hydro-cyclone 12 to the slurry tank 4 to be recycled and reprocessed. Or the separation (classification) of particles may be preferably performed dry after the drying stage as described hereinafter, by using pneumatic type cyclones and air classifiers. Typically particles are subjected to air attrition to deagglomerate particles which become agglomerated in the drying and calcining stages as a result of alkalis that may be present in the slurry before classification. Particles can be classified into grades at sizes as small as less than 2 microns.

The mixture is passed in a continuous flow between the chambers 7 and 8 via a conduit 10. The ultrasonic horns 9 are energised by electromechanical generators 14, which are supplied with power from a source 15.

It will be appreciated that, instead of two separate flow chambers 7 and 8, it is possible to employ a single flow chamber having a plurality of ultrasonic vibrators along its length, and that the means to convey the vibrations to the particulate material may be other than a horn. For example, it is possible for rods to extend from generators, such as those shown diagrammatically at 14, into the moving particulate material, in order to cause the material to be vibrated. Other forms of transducer, for example a plurality of frusto-conical transducer elements, arranged in line, and through which the material passes successively may be employed.

The applicants have found that, in one particular arrangement the use of ultrasonic vibrations in the range of 15 to 30 kHz, generated by piezo-electric crystals and transmitted and focused in the slurry pulp by titanium disrupter horns 9, has proved particularly advantageous in producing "cavitation". Cavitation causes the formation and implosion of microscopic vapour bubbles, and results in a shearing and tearing action (of the particle chemical or physical bonding), thus causing a greater number of free ultra fine fine particles in the slurry pulp.

In the arrangement mentioned above, the action is concentrated in a particular region as a result of the design of a transducer horn and of transducer probes, and the slurry pulp which is under treatment in the chambers 7, 8, is maintained at a pressure between 100 and 200 pounds per square inch. The particles of the desired size, which are obtained from the hydro-cyclone 12, are fed via the conduit 13 to a gravity-type unit (not shown), such as an oscillating centrifuge or flotation column, for the recovery of liberated by-products, including metal, and the main product is fed to a holding tank for treatment such as dewatering and drying (if necessary) and storage before being delivered to users.

In another arrangement to be described with reference to FIG. 2, in which similar components are identified by means of the same reference numerals, a single flow chamber 7a, which is a tubular ultrasonic irradiator, is illustrated having a plurality of ultrasonic vibrators, such as horns 9, along its length, and the output from the chamber 7a is passed via a sump 16 and a pump 17, via the conduit 11, to the hydrocyclone 12. The power applied to the horns 9 is, in a particular method, between 1 and 5 kw, at a frequency of around 20 KHz.

The sonicated slurry pulp output from the hydrocyclone 12 is passed via a conduit 13 to a second stage 2 illustrated with reference to FIG. 3.

Figure 3:
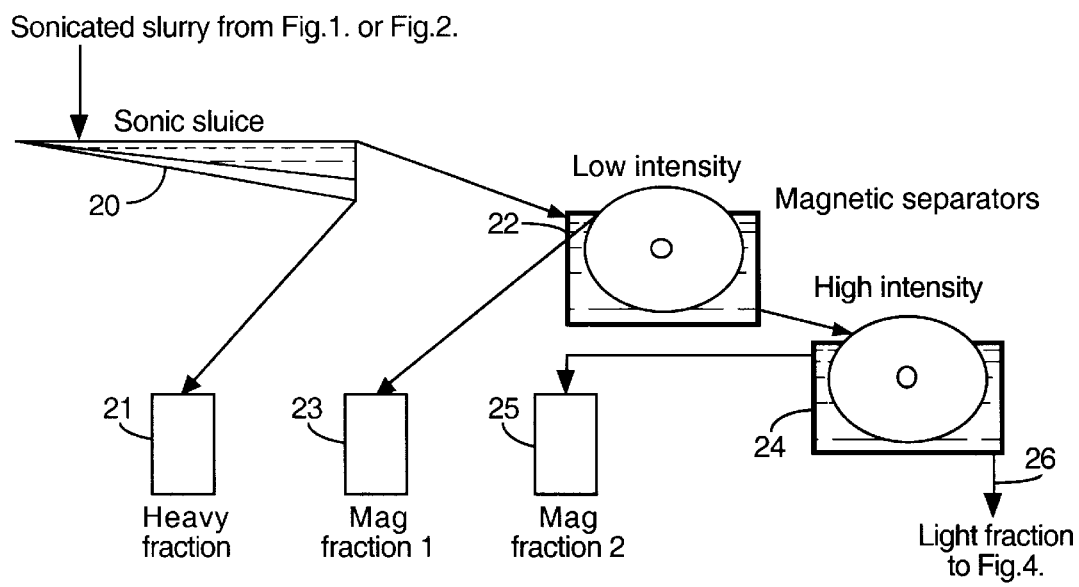
Figure 4:
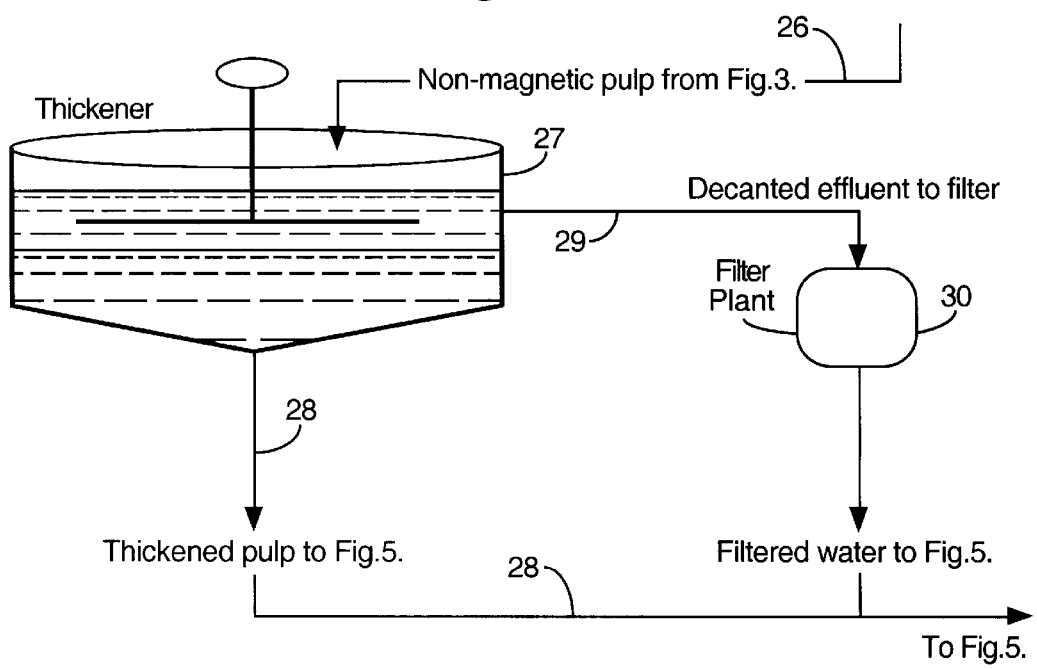

Instead of the fly ash being delivered to the silo 1, it may, if wet, be delivered directly to stage 2 (FIG. 3).

Figure 2:
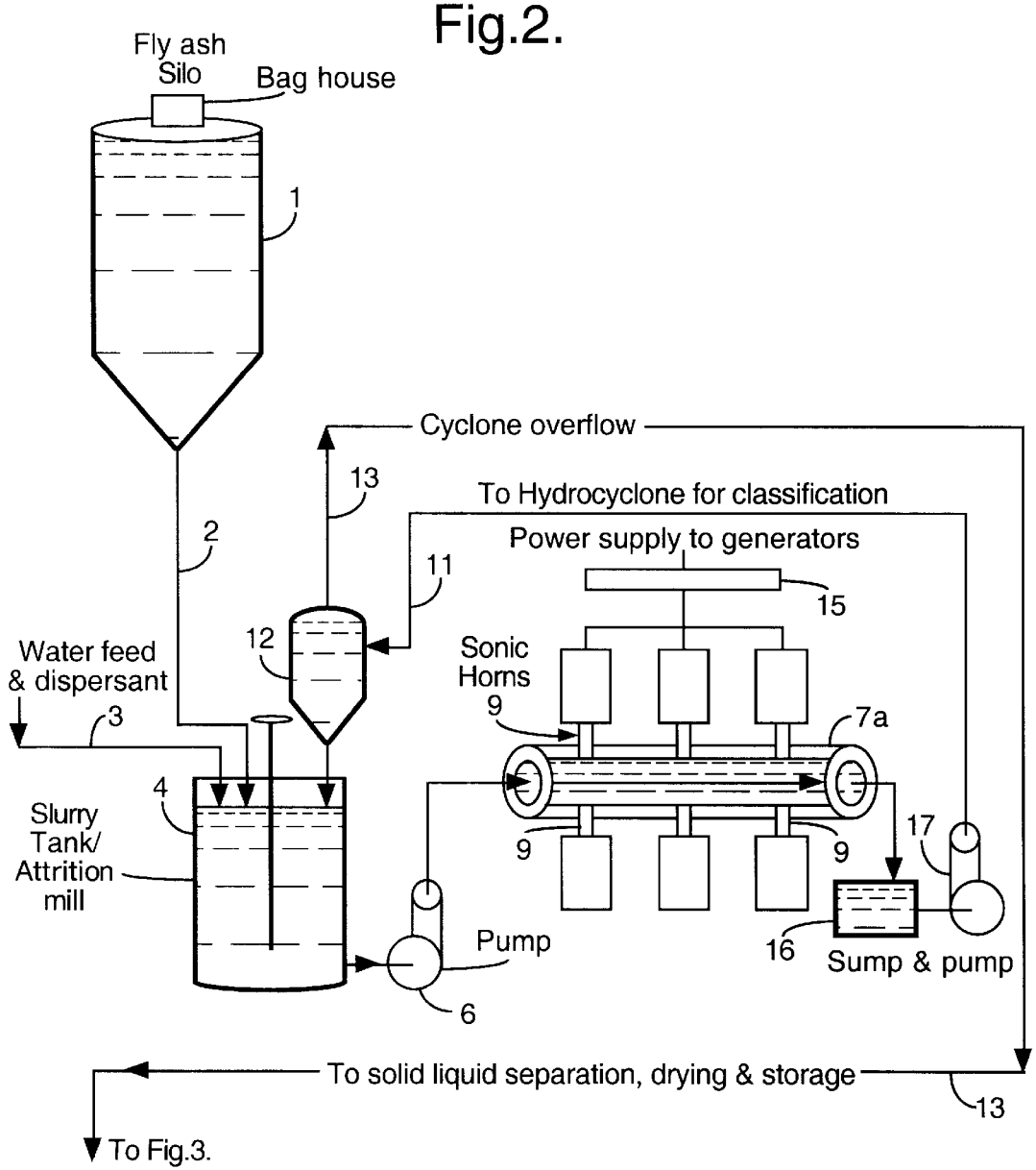

In a particular method, the fly ash is conveyed to the slurry tank/attrition mill 4 shown in FIGS. 1 and 2 with recycled and make-up water for a period of 30 to 90 minutes. A dispersant, for example stearic acid, is added continuously in small amounts, e.g. 500 to 1000 parts per million. The pump 6 may be a screw/gear type non-resonating pump.

The slurry pulp is pumped, as indicated in FIGS. 1 and 2, via conduit 11 to the hydrocyclone 12 for classification at around 45 microns. The underflow, that is the plus 45 micron fraction, may either be recycled for further sonication, or fed to a vacuum type filter, such as that shown in FIG. 6, the overflow, being the minus 45 micron fraction, being gravity fed into a gravity separator, such as a centrifuge or sonic sluice, the heavy fraction being fed to a storage container, and the light fraction being fed to the arrangement of FIG. 4.

Referring to FIG. 3, the sonicated slurry from stage 1 (FIG. 1 or FIG. 2) is shown passing via a sonic sluice 20. The heavy fraction is fed directly to a container 21. The remainder is passed to a first low intensity magnetic separator 22, operating at between 1,000 and 1,500 gauss, from which a magnetic fraction 1 is fed to a container 23. The remainder of the material is fed from the separator 22 to a high intensity magnetic separator 24 operating at between 5000 to 10,000 gauss and the magnetic fraction which is obtained from the separator 24 is stored in a container 25. From the separator 24 a light fraction of non-magnetic pulp is fed via a conduit 26 to a third stage which includes a thickener 27 from which thickened pulp is passed via a conduit 28 to a fourth stage to be described with reference to FIG. 5. Decanted effluent from the thickener 27 is passed via a conduit 29 and a filter plant 30 to the conduit 28.

Figure 5:
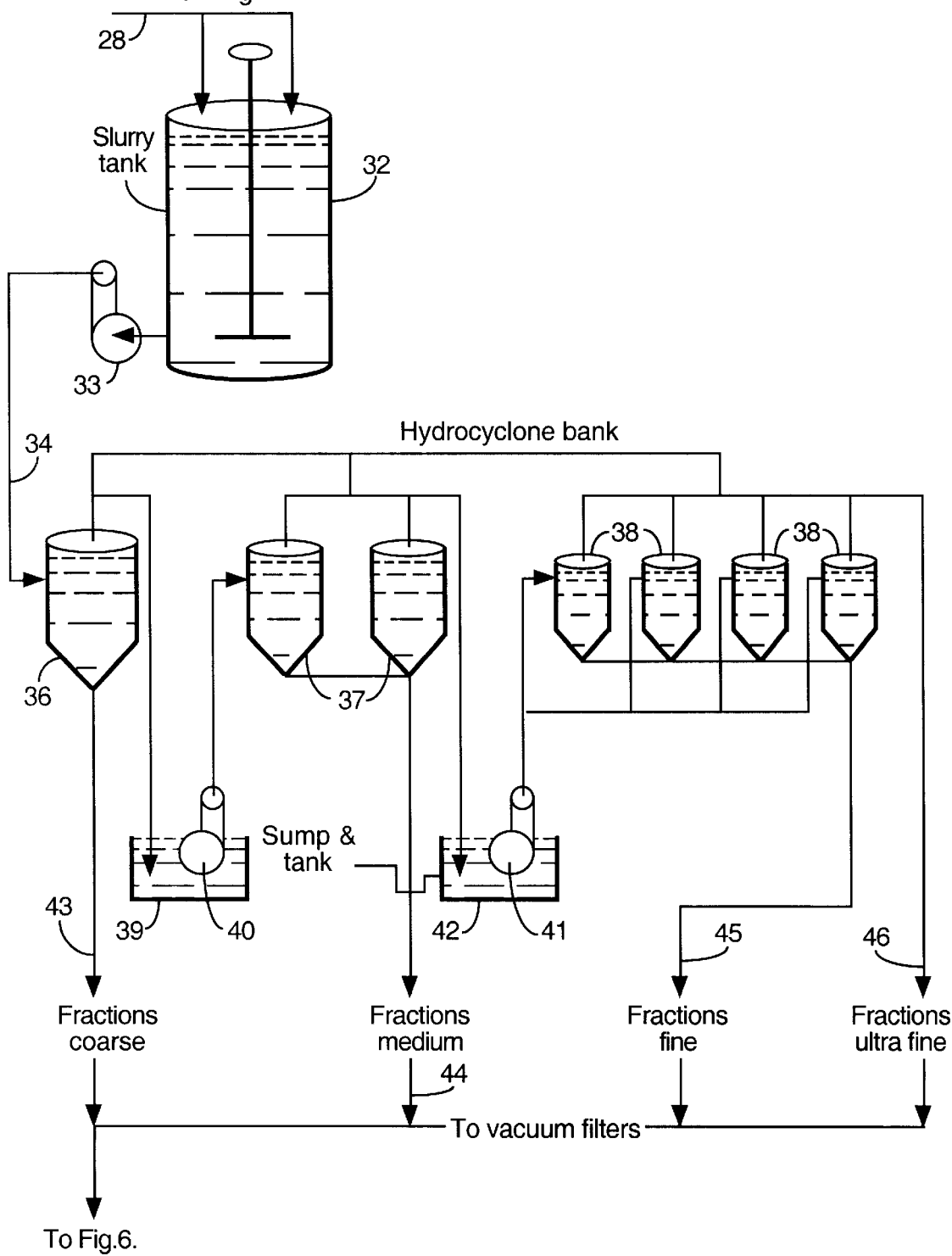

Referring to FIG. 5, the thickened pulp and filtered effluent in the conduit 28 is shown being fed to a slurry tank 32, whose output is passed via a pump 33 and a conduit 34 to a bank of hydrocyclones consisting of a single hydrocyclone 36, a pair of hydrocyclones 37 and four hydrocyclones 38. A sump and a pump 39 and 40 are provided to feed the material between the hydrocyclones 36 and 37, and a pump and sump 41 and 42 are provided to feed the material between the hydrocyclones 37 and 38. Coarse and medium fractions are obtained via conduits 43 and 44 from the hydrocyclones 36 and 37 respectively, and from the hydrocyclones 38 there are obtained via conduits 45 and 46 fine and ultrafine grades of material respectively.

Figure 6:
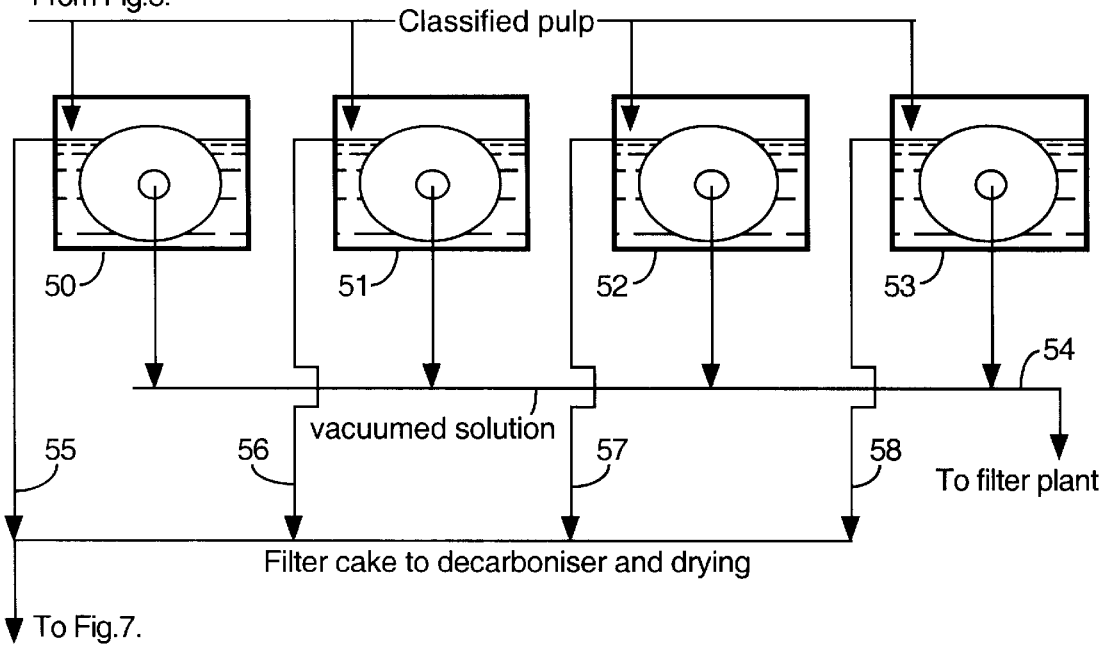
Figure 7:
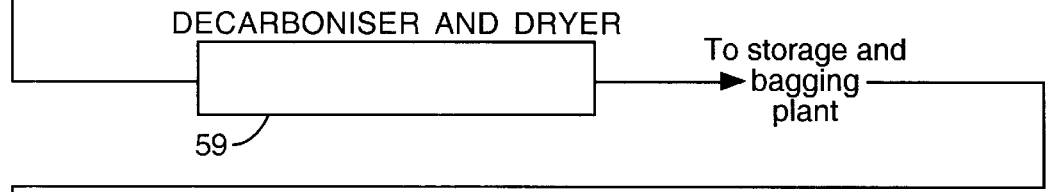
Figure 8:
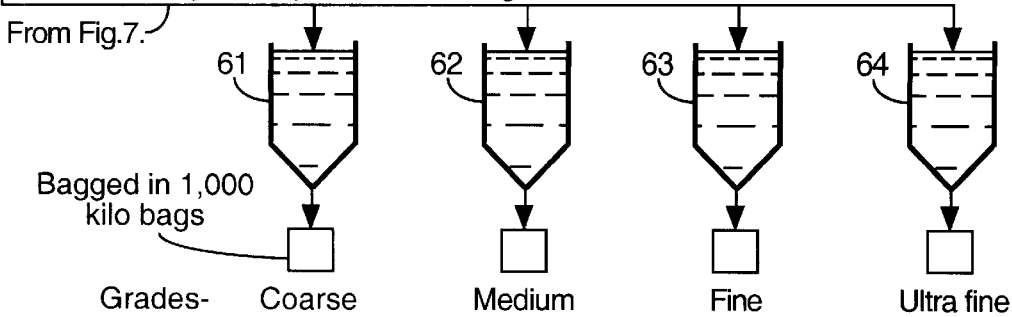

These classified grades of material are passed to a vacuum filter (which may be of the rotary drum, filter press or other type of vacuum filtering equipment) stage illustrated diagrammatically in FIG. 6, where the classified grades of pulp are shown being fed separately to respective vacuum filters 50, 51, 52 and 53, from which the vacuumed solutions are fed via a conduit 54 to a filter plant. The filtered cake is shown diagrammatically being passed via respective paths 55, 56, 57 and 58 and decarbonizers and dryers, or burners/calciners, indicated at 59, where any organic material is burnt off, to a final stage shown in FIG. 8 in which the dried graded material is shown being fed via respective silos to bags 61–64 for the coarse, medium, fine and ultrafine material.

It is possible alternatively or additionally for organic material to be burnt off at some other stage in the process, for example during the passage of the material from the silo 1 into a calciner, such as a rotary kiln type, where the exothermic energy generated from the carbon and the iron oxides that are precipitated from the flue with the ash and the temperature of the ash itself, being 100° C. to 300° C., is sufficient to power a generator to produce energy to the extent of 0.5 to 2 megawatts per 2 to 4 tonnes of throughput, depending on the carbon and iron oxide content, where the carbon content can vary from 6% to in excess of 20% and the iron oxide content from 5% to 15%. Further, a supplementary feed, such as natural gas or coal dust or waste can be made to make up to a desired GJ/h energy balance to achieve a consistent energy source to the generator. The resultant fly ash being ideally suited for sale to the cement replacement concrete industry or as a feed to the process plant as described in this application.

Alternatively, depending on the fly ash which is being processed it may be desirable to convert, with controlled heating and oxidisation conditions, the magnetite ($Fe_3O_4$) and or hematite ($Fe_2O_3$) in the ash into highly magnetic gamma ferric oxide (FeO), which is more magnetic than magnetite and hematitite to aid in the magnetic separation, or for the purpose of subsequently calcining the ash.

In summary, it will be understood that by using the process described above, ash particles may be vigorously scrubbed or polished during their passage through the chambers 7 and 8, enabling surface salts to be removed and dissolved in the aqueous medium.

During the ultrasonic treatment of a slurry containing ash in the chambers 7, 7a, and 8, the surfaces of the ash particles are cleaned, and/or partially disintegrated, preferably retaining their spheriodal shape, causing heavy metals, that had become locked in the ash particles as a result of fusion while the material was being burnt in the furnace, to be released.

It is, moreover, possible to pre-treat the material in a slurry tank to reduce it to a pulp with a density, by weight, of between 15% to 50% of its original density.

After treatment, magnetic separators may be used to remove certain metallic oxides. For example, a low intensity magnetic separator may be used to remove iron oxides and paramagnetic metals may be removed using a high intensity separator. A centrifuge may be used to capture non-magnetic particles appearing in the conduit 13. Water that is removed is pumped through a filtering step for recycling, or simply discharged.

It will be understood that the resultant product may be separated out from the hydro-cyclone 12 (FIG. 1 and FIG. 2) at varying particle sizes, for example at 5, 10, 20, 30 or 45 microns, for use in particular respective applications, for example as a mineral filler, extender, or pigment, a replacement for Portland cement, or a fine concrete additive.

Fly ash or bottom ash produced and treated in the ways described above may be used as a filler, an extender, a pigment extender, a pigment, an additive, a replacement, a bulking agent or a viscosity agent (improver) in industrial products such as paint, coatings, plastics, resins, paper, rubber, ceramics, sealants, adhesives, concrete and other building products.

The invention also provides methods of treating particulate material, for example fly ash produced and treated in one of the above mentioned ways.

It is possible to coat the surface of fly ash or bottom ash particles produced and treated in the ways described above with pigments and chemicals such as titanium dioxide, iron oxides, synthetic and natural stearic acid, barium sulphate, precipitated calcium carbonate, calcium hydroxide and magnesium carbonate using ultrasonic and sonochemical techniques.

In one coating operation, fly ash particles produced by the processes described above, which were of 0.01 microns to 100 microns in diameter, were introduced with the coating material, which was a $TiO_2$ pigment, into a chamber and treated by ultrasonic vibrations at a frequency between 15 and 40 kHz for between 1 and 120 seconds.

Other mineral materials, for example sand, may be coated using a similar ultrasonic process.

It will be seen that it is possible to eliminate or at the least reduce the use of solvents in paints by employing fly ash, beneficiated as described above by the removal, in particular, of materials that may be deleterious to paint, for example unburned carbon and metallic elements.

It is believed that the reduced need for, or the elimination of, a solvent results from the fact that the beneficiated fly ash, having a low specific gravity (1.8 to 2.3 $g/cm^3$) and spherical shape, and therefore low bulk density (0.8 to 1.1 $g/cm^3$), lowers the viscosity of a mixture in which it is incorporated. Further, the low surface area of beneficiated fly ash being spherical, results in low oil demand and therefore less vehicle/binder.

The coating of the beneficiated fly ash particles, in the way described using ultrasonic vibrations, improves the brightness of any mixture in which the coated particles are incorporated.

It will be appreciated that the particles may be coated by methods employing other means than ultrasonic vibrations.

A particular paint formulation, for example, employs 55–62.5% of beneficiated fly ash (i.e. treated using one of the processes described above), 10% water, 20% $TiO_2$ pigment and 7½–15% of a vehicle (binder/resin) e.g. oligomer. These components were emulsified sonically.

Figure 9:
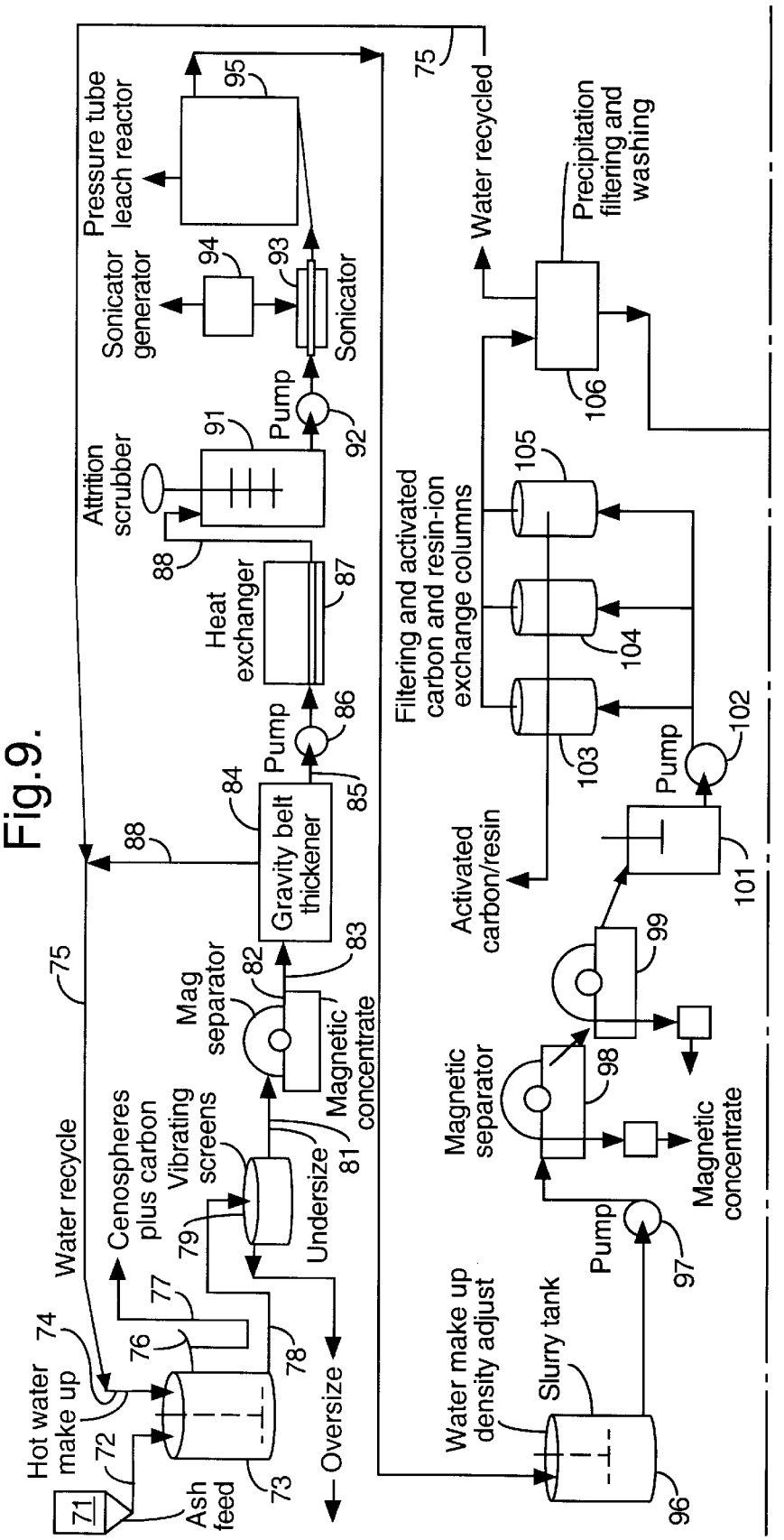
Figure 9:
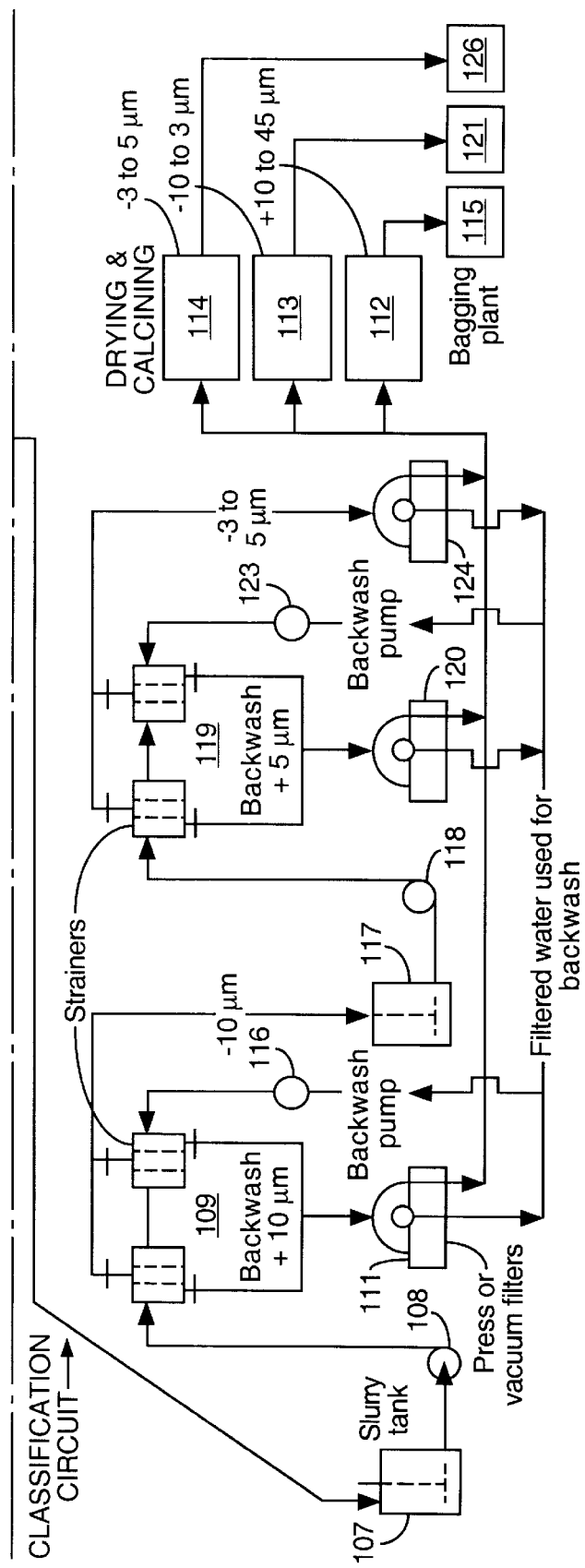

Reference will now be made to FIG. 9, in which there is shown a complete system, which is similar to, but has variations with respect to the previously described system.

In FIG. 9, there is shown a storage silo 71 to which fly ash is delivered directly from a power plant by a pneumatic system, by road, or by rail. The fly ash is passed from the silo 71 via a conduit 72 to a slurry tank 73 where, by the addition of hot make-up water, as indicated at 74, and recycled water from later stages in the system, as indicated at 75, the mixture is given a pulp density of 20% to 50% solids by weight.

The slurry tank 73 is fitted with an overflow weir, indicated at 76 allowing for 2% to 5% of the slurry pulp, depending on the fly ash being treated, to overflow into the weir 76 for the removal of hydrophobic material, such as partially oxidised coal, (unburned carbon), and hollow spheres (cenospheres) known as "floaters", which are removed via a conduit. Slurry pulp is gravity fed or pumped from the bottom of the slurry tank 73 via a conduit 78, at a rate to equal 98% to 95% of the feed to the slurry tank, to vibrating screens 79 fitted with one or more 50 μm to 75 μm sieves for the removal of a substantial amount of the unburned carbon, (partially oxidised coal) and oversize ash particles. The oversize fraction is stockpiled for further treatment, sold as a recycled fuel source, and partially used in a later stage of the system. The undersize fraction of the slurry pulp is fed via a conduit 81 to a low intensity (500 to 1500 gauss) magnetic separator 82 for the removal of a magnetic ash fraction and discrete magnetic particles, mainly magnetite (iron oxide), which are further stockpiled for further benefication, or used or sold as a feed stock for pure ion oxide pigment production, which may be used later in the process to coat the ash. The unmagnetised fraction of the slurry pulp that is not removed by magnetic force is fed via a conduit 83 to a gravity belt type thickener 84, where it is thickened to a pulp density of 60 to 70% solids by weight. Other types of thickener than a gravity belt thickener may, of course, be used. The thickened pulp is then conveyed via a conduit 85 and a positive displacement type pump 86, through a heat exchanger 87 to raise the slurry temperature to between 100° C. to 300° C. The water that is removed from the thickener 84 is returned via conduit 88 to the slurry tank 73.

Slurry pulp from the heat exchanger 87 is fed by a tubular connection 89 to an attrition scrubber 91 in order to provide autogenous scrubbing of particles in the slurry to dislodge elements which have become fused to the surface of the spheres during combustion and thus to condition the particles to be more amenable to treatment in subsequent stages. Slurry pulp from the scrubber 91 is fed to a positive displacement pump and thence to a flow cell 93 which is fitted with ultra sonic irradiators (resonators, transducers) and is referred to as a sonicator. Power input to the sonicator 93 from a generator 94 can be between 1,000 to 10,000 kW, the sonicator frequency being typically 20 kHz. Slurry pulp being subjected to cavitation caused by the sonic irradiation in the sonicator 94 is deagglomerated and pleurospheres, (spheres encapsulated within spheres), are cracked releasing the encapsulated spheres, resulting in substantial size reduction and therefore a substantial increase in the amount of the fine and ultra fine particles, (0.1 to 10 μm particle sizes). Further, chemical leaching reactions of the alkali salts and other amorphous elements are initiated. Pulp exiting the sonicator 93 is fed by a pump (not shown) to a reactor 95, which in the particular embodiment has a tube reactor consisting of coiled high pressure steel tubing being 60 cm to 180 cm in diameter and of lengths from 100 meters to 2,000 meters, depending on the desired throughput volumes and residence times required for the dissolution of alkali salts and other amorphous elements. Pressures of between 3 bar to 50 bar may be required, depending on the fly ash being treated, which can be protected from the effect of excess pressure being developed by the installation of pressure relief valves. Additional heating of the slurry pulp may be necessary and may be achieved by the installation of a heat exchanger which involves passing sections of the coiled tube of the reactor 95 through a jacket containing heating oil or steam to obtain the desired temperatures, which may vary from 100 to 300 degrees centigrade. The dissolution of alkali salts and other elements volatised during the combustion step and deposited on the surfaces of the ash particles by condensation on cooling is completed in this stage. Leach reagents may be added, in addition to water, to the slurry pulp at this stage.

Pulp exiting the reactor 95 is gravity fed into a slurry tank 96 for the adjustment of the pulp density by means of the addition of water. Density is adjusted to 20% to 33% solids by weight.

Pulp from the slurry tank 96 is fed via a pump 97 through additional magnetic separators 98 and 99, the first separator 98 being a low intensity (500 to 1500 gauss) magnetic separator, and the second separator 98 in series being a high intensity magnetic separator (5000 to 10000 gauss) for the removal of magnetic and para magnetic particles released as a result of the sonic irradiation in the sonicator 93 and having been made discrete as a result of being released from entrapment on the spherical particle surface by the steps of attrition scrubbing and leaching of the alkali salts in the scrubber 91 and the leach reactor 95.

Slurry pulp is then fed into a slurry tank 101 connected to a pump 102 to feed a filtering and ion exchange system 103–105. The system 103 to 105 includes columns containing the oversize activated carbon separated from the slurry pulp by the vibrating screens 79. A vessel containing activated resins may be included in series in order to remove by adsorption additional elements which will be in the leach solution as a result of prior treatment. A precipitation tank 106 may be included after the filtering stage 103–105 for the precipitation of alkali salts. Loaded resins and activated carbon may subsequently be treated for the recovery of adsorbed elements as by-products and alkali salts may be recovered as additional by-products.

Filtered slurry from columns 103–105 is then fed into a solid-liquid precipitation separation and washing system 106 to achieve a clean vitreous spherical filter cake which is conveyed to a classification circuit. Solution is recycled to the tank 73 via conduit 75.

Filter cake from the system 106 is reslurried in a slurry tank 107 of the classification circuit to a pulp density of 25% to 30% solids by weight for feeding by pumping through a series of classifiers. The classifiers may, for example, be either hydrocyclones or strainers. Particles are classified into medium, fine and ultra fine sizes, the total slurry being classified first, where a separation at between 25 and 30 $\mu$m is achieved, the over size being fed to a solid liquid separator and the undersize being fed to a secondary system for the separation of particles at 10 $\mu$m. The resultant oversize particles are fed to a second solid liquid separator and the undersize particles are fed to a third system for separation at 3 $\mu$m to 5 $\mu$m, the oversize and the undersize being fed to separate solid-liquid separators. The solid liquid separators are typically filter presses, rotary drum filters or centrifuges.

In the classification circuit, the slurry is pumped via a pump 108 from the slurry tank 107 to a first classifier including a solid/liquid separator backwash tank 109, which provides an output for material of greater diameter than 10 $\mu$m solid/liquid to a press or vacuum filter 111. An output from the filter 111 is fed to drying and calcining units 112 to 114 and thence to a first bagging unit 115. Filtered water is returned to the tank 109 via a pump 116. Material having a dimension less than 10 $\mu$m is fed from the tank 109 to a further slurry tank 117 from which it is pumped via a pump 118 to a second solid/liquid separator backwash tank 119. Particles having a size between 5 $\mu$m and 10 $\mu$m are passed to a press or vacuum filter 120 from the tank 119 and thence to a second bagging unit 121 via the drying and calcining unit 113. Filtered water is returned to the tank 119 via a pump 123 and particles up to 5 $\mu$m in size are passed to a press or vacuum filter 124 from the tank 119 and thence via the drying and calcining unit 114 to a bagging unit 126. Input and output strainers 127 and 128 of appropriate dimensions are employed at the respective inputs and outputs of the tanks 109 and 119.

Or the separation (classification) of particles may be preferably performed dry after the drying stage as described hereinafter, by using pneumatic type cyclones and air classifiers. Typically particles are subjected to air attrition to deagglomerate particles which become agglomerated in the drying and calcining stages as a result of alkalis that may be present in the slurry before classification. Particles can be classified into grades at sizes as small as less than 2 microns.

Classified pulp is fed through a dryer and calciner system in series in order to burn off the organic material and to oxidise occluded magnetite, if it has not been completely removed in the preceding stages.

The separated product from the drying and calcining units may be cooled and stored in silos connected to the bagging system. Each grade may be bagged or stored in silos for bulk transport to the market, or it may be further treated and then bagged or stored.

Certain classified and separated grades may be coated with different coating agents to improve the brightness and other physical characteristics of the particles. Milk of lime, calcium hydroxide and calcium oxide in solution may be precipitated from solution in a further treatment by the bubbling of carbon dioxide through a solution in the presence of the vitreous ash spheres, which have activated surfaces as result of the heat treatment, (calcining), as a precipitated calcium carbonate (PCC). The tank used in this further treatment may be sonicated accelerating the bonding of the PCC to the spherical particle surface. Other coating agents may be used in coating the spherical ash particles, which have been treated in the preceding stages, using sonochemistry, such as titanium dioxide, iron oxide or other agents.

It will be appreciated that, although particular items of apparatus have been identified in describing the examples shown in the drawing, it is possible to employ various alternative items of apparatus able to perform the same or similar functions in carrying out the steps of the process.

The methods described above for treating fly ash may be used to achieve deagglomeration, to remove surface salts and other matter on the surface of particulate material during and after combustion and to reduce particle size, as well as to provide coatings on particulate material.

Although the invention has been illustrated with reference to particular arrangements, by way of example, it will be appreciated that variations and modifications thereof, as well as other arrangements may be employed within the scope of the protection sought.

It will, of course, be understood that although a hydrocyclone has been described as a separator or filter, any other well known separator or filter may be used.

It will also be appreciated that, although in the particular arrangements described as examples in illustration of the invention, the final product has been graded or classified into particular sizes, it may be preferred that for some applications the product should be a mixture of many different sizes.

What is claimed is:

1. A method of treating fly ash or bottom ash particulate material obtained by burning coal including the steps of mixing the material with a fluid to form a slurry and subjecting the slurry to vibrations at an ultrasonic frequency, the ultrasonic vibrations having such a frequency and power that plurospheres in the particulate material are cracked open, thereby releasing spheres of the material which are encapsulated within the plurospheres, and separating the material so-treated from the slurry.

2. A method as claimed in claim 1 in which the ultrasonic vibration is in a frequency band variable between 15 and 30 kHz.

3. The method of claim 1 further including the step of classifying the material with a hydrocyclone and returning oversize material to an ultrasonic continuous flow chamber for further cavitation, and passing on undersize material not requiring further cavitation.

4. The method of claim 3 further including passing the undersize material through an attrition scrubber to deagglomerate fused particulate material and scrubbing by attrition fused and bonded alkali salts from the surfaces of the particulate material.

5. The method of claim 1 further comprising releasing particles fused and bonded to the surfaces of the particulate material by ultrasonic irradiation producing cavitation and by attrition scrubbing.

6. The method of claim 1 further comprising releasing and removing magnetic particles present in the particulate material before the particulate material is treated by the ultrasonic irradiation step.

7. The method of claim 1 further comprising releasing and removing magnetic particles present in the particulate material after the particulate material is treated by the ultrasonic irradiation step.

8. The method of claim 1 further including leaching alkali salts coating the surfaces of the particulate material from the material in a tubular pressure reactor at elevated values of pressure and temperature.

9. The method of claim 1 further including classifying the particulate material into particular range sizes by applying the particulate material to a vibrating screen.

10. The method of claim 1 further including classifying the particulate material into particular size ranges by subjecting the particulate material to a hydrocyclone.

11. The method of claim 1 further including converting magnetite ($Fe_3O_4$) and/or hematite ($Fe_2O_3$) in the particulate material into highly magnetic gamma ferric oxides under controlled heating conditions.

12. The method of claim 1 further including magnetically separating the particulate material which has been subjected to the ultrasonic vibrations to remove certain metallic oxides from the particulate material.

13. The method of claim 1 further including calcining the particulate material to burn off organic material.

14. The method of claim 1 further including coating the separated material with a coating agent.

15. The method of claim 1 further including the step of magnetically separating out treated material from the slurry.

16. Spheres released from within plurospheres by the method of claim 1.

17. A method for use in treating fly ash or bottom ash particulate material obtained by burning coal, the particulate material including plurospheres and the method including the steps of mixing the material with a fluid to form a slurry, and subjecting the slurry to vibrations at an ultrasonic frequency such that there is cavitation of the particulate material and the plurospheres are cracked open, thereby releasing spheres of the material which are encapsulated within the plurospheres, and leaching alkali salts coating the surfaces of the particulate material from the material in a tubular pressure reactor at elevated values of pressure and heat.

18. A method for use in treating fly ash or bottom ash particulate material obtained by burning coal, the particulate material including plurospheres and the method including the steps of mixing the material with a fluid to form a slurry, and subjecting the slurry to vibrations at an ultrasonic frequency such that there is cavitation of the particulate material and the plurospheres are cracked open, thereby releasing spheres of the material which are encapsulated within the plurospheres, and calcining the particulate material in the presence of a reducing agent, such as carbon monoxide gas, and converting the residual particulate material containing iron oxides in the form of magnetite ($FeO.Fe_2O_3$) and hematite ($Fe_2O_3$), not previously removed by magnetic separation, into gamma ferric oxides, (FeO), resulting in a particulate material which is substantially lighter in colour than it would otherwise be.

19. A method for use in treating fly ash or bottom ash particulate material obtained by burning coal, the particulate material including plurospheres and the method including the steps of mixing the material with a fluid to form a slurry, and subjecting the slurry to vibrations at an ultrasonic frequency such that there is cavitation of the particulate material and the plurospheres are cracked open, thereby releasing spheres of the material which are encapsulated within the plurospheres, and calcining the particulate material in an oxidising atmosphere, and the residual particulate material containing iron oxides in the form of magnetite ($FeO.Fe_2O_3$), not previously removed by magnetic separation, is converted into hematite, resulting in a particulate material which is substantially yellow to orange in colour.

20. A method for use in treating fly ash or bottom ash particulate material obtained by burning coal, the particulate material including plurospheres and the method including the steps of mixing the material with a fluid to form a slurry, and subjecting the slurry to vibrations at an ultrasonic frequency such that there is cavitation of the particulate material and the plurospheres are cracked open, thereby releasing spheres of the material which are encapsulated within the plurospheres, the particulate material having been calcined to gamma ferric oxide, and being therefore more magnetic than magnetite and hematite, and separating the gamma ferric oxide from the residual non-magnetic fraction.

21. A method for use in treating fly ash or bottom ash particulate material obtained by burning coal, the particulate material including plurospheres and the method including the steps of mixing the material with a fluid to form a slurry, and subjecting the slurry to vibrations at an ultrasonic frequency such that there is cavitation of the particulate material and the plurospheres are cracked open, thereby releasing spheres of the material which are encapsulated within the plurospheres, and calcining the particulate material to burn off the carbon material.

22. A method for use in treating fly ash or bottom ash particulate material obtained by burning coal, the particulate material including plurospheres and the method including the steps of mixing the material with a fluid to form a slurry, and subjecting the slurry to vibrations at an ultrasonic frequency such that there is cavitation of the particulate material and the plurospheres are cracked open, thereby releasing spheres of the material which are encapsulated within the plurospheres, during the step of ultrasonic irradiation adding to the particulate material a coating agent of synthetic or natural iron oxide pigments, titanium dioxide, or precipitated calcium carbonate, the ultrasonic irradiation causing the particles to become coated and to achieve a desired colour.

* * * * *